(12) United States Patent
Lee

(10) Patent No.: US 10,744,485 B2
(45) Date of Patent: Aug. 18, 2020

(54) MOF-DERIVED POROUS CARBON MATERIALS FOR CARBON DIOXIDE CAPTURE

(71) Applicant: INCHEON UNIVERSITY INDUSTRY ACADEMIC COOPERATION FOUNDATION, Incheon (KR)

(72) Inventor: Chang Yeon Lee, Incheon (KR)

(73) Assignee: INCHEON UNIVERSITY INDUSTRY ACADEMIC COOPERATION FOUNDATION, Incheon (KR)

( * ) Notice: Subject to any disclaimer, the term of this patent is extended or adjusted under 35 U.S.C. 154(b) by 81 days.

(21) Appl. No.: 15/860,657

(22) Filed: Jan. 3, 2018

(65) Prior Publication Data
US 2018/0214849 A1    Aug. 2, 2018

(30) Foreign Application Priority Data

Feb. 2, 2017   (KR) .................. 10-2017-0014887

(51) Int. Cl.
  *B01J 20/30*    (2006.01)
  *B01D 53/02*    (2006.01)
  *B01J 20/28*    (2006.01)
  *B01J 20/20*    (2006.01)

(52) U.S. Cl.
  CPC .......... *B01J 20/3078* (2013.01); *B01D 53/02* (2013.01); *B01J 20/20* (2013.01); *B01J 20/2808* (2013.01); *B01J 20/28064* (2013.01); *B01J 20/28066* (2013.01); *B01D 2253/102* (2013.01); *B01D 2253/204* (2013.01); *B01D 2253/306* (2013.01); *B01D 2253/308* (2013.01); *B01D 2257/504* (2013.01); *Y02C 10/04* (2013.01); *Y02C 10/08* (2013.01)

(58) Field of Classification Search
  CPC .................................................. B01J 20/3078
  See application file for complete search history.

(56) References Cited

U.S. PATENT DOCUMENTS

2012/0049110 A1*   3/2012   Trukhan .............. H01M 4/0471
                                                      252/182.1

OTHER PUBLICATIONS

Chang, L., Li, J., Duan, X., & Liu, W. (2015). Porous carbon derived from Metal-organic framework (MOF) for capacitive deionization electrode. Electrochimica Acta, 176, 956-964. (Year: 2015).*

(Continued)

*Primary Examiner* — Anthony J Zimmer
*Assistant Examiner* — Ricardo D Morales
(74) *Attorney, Agent, or Firm* — Revolution IP, PLLC

(57) ABSTRACT

The MOF-derived porous carbon materials for carbon dioxide capture, more specifically comprising a method for preparing thereof and the porous carbon materials for the purpose of $CO_2$ absorbent, wherein the porous carbon materials from zinc-containing three MOFs (MOF-5, MOF-177, and bioMOF-100) are synthesized by a simple pyrolysis and thereby the porous carbon materials have promising $CO_2$ capture capacity and selectivity compared to parent of MOFs prior to pyrolysis, particularly, the $CO_2$ capture capacity of the porous carbon materials is maintained under humid condition.

8 Claims, 8 Drawing Sheets

(56) References Cited

OTHER PUBLICATIONS

Khan, I. A., Badshah, A., Haider, N., Ullah, S., Anjum, D. H., & Nadeem, M. A. (2014). Porous carbon as electrode material in direct ethanol fuel cells (DEFCs) synthesized by the direct carbonization of MOF-5. Journal of Solid State Electrochemistry, 18(6). (Year: 2014).*

An, J., Farha, O. K., Hupp, J. T., Pohl, E., Yeh, J. I., & Rosi, N. L. (2012). Metal-adeninate vertices for the construction of an exceptionally porous metal-organic framework. Nature communications, 3, 604. (Year: 2012).*

Kim et al. ("Beyond pristine MOFs: carbon dioxide capture by metal-organic frameworks (MOFs)-derived porous carbon materials." RSC advances 7.3 (2017) (Year: 2017).*

An et al. ("Metal-adeninate vertices for the construction of an exceptionally porous metal-organic framework". Nature communications, 3, 604, 2012) (Year: 2012)*

Kim et al. ("Beyond pristine MOFs: carbon dioxide capture by metal-organic frameworks (MOFs)-derived porous carbon materials." RSC advances 7.3 (2017) (Year: 2017) Supplemental Information.*

An et al. ("Metal-adeninate vertices for the construction of an exceptionally porous metal-organic framework". Nature communications, 3, 604, 2012). (Year: 2012).*

Khan et al. ("Porous carbon as electrode material in direct ethanol fuel cells (DEFCs) synthesized by the direct carbonization of MOF-5". Journal of Solid State Electrochemistry, 18(6), 1545-1555, 2014). (Year: 2014).*

An et al. ("Meal-adeninate vertices for the construction of an exceptionally porous metal-organic framework." Nature communications, 3, 604, 2012.) (Year: 2012).*

S. R. Caskey, A. G. Wong-Foy and A. J., Matzger, "Dramatic tuning of carbon dioxide uptake via metal substitution in coordination polymer with cylindrical pores", J. Am. Chem. Soc., 2008, 130 (33), pp. 10870-10871.

* cited by examiner

[Figure. 1]
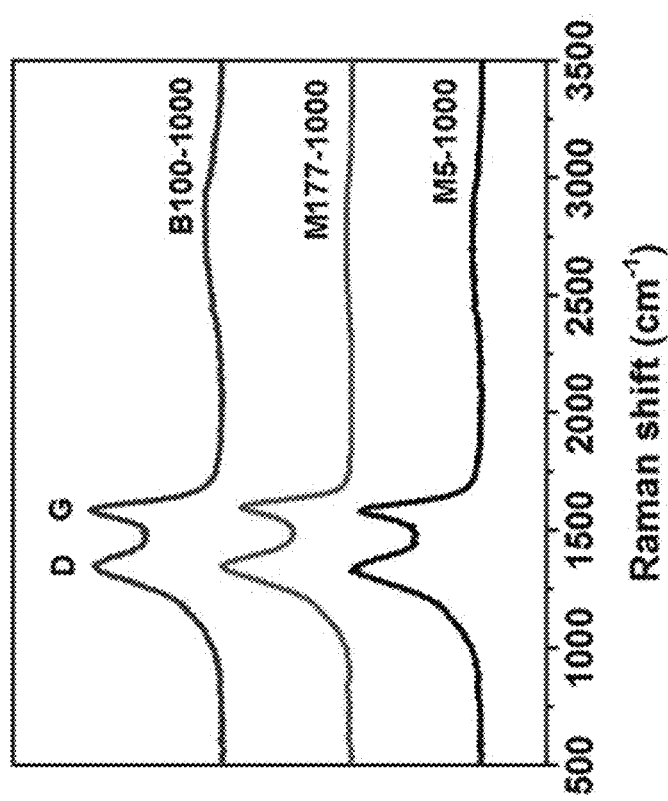
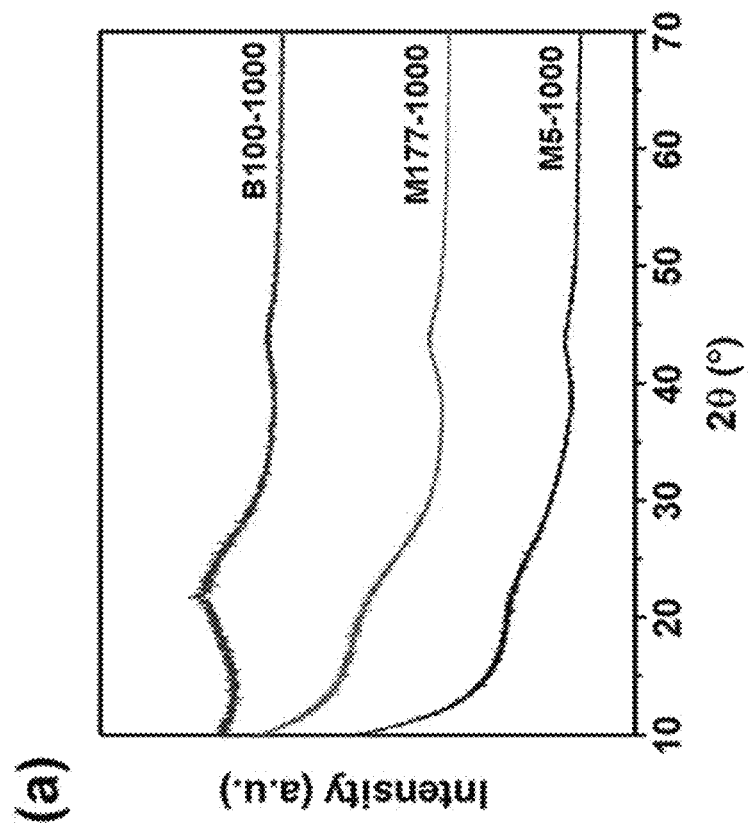

[Figure.2]
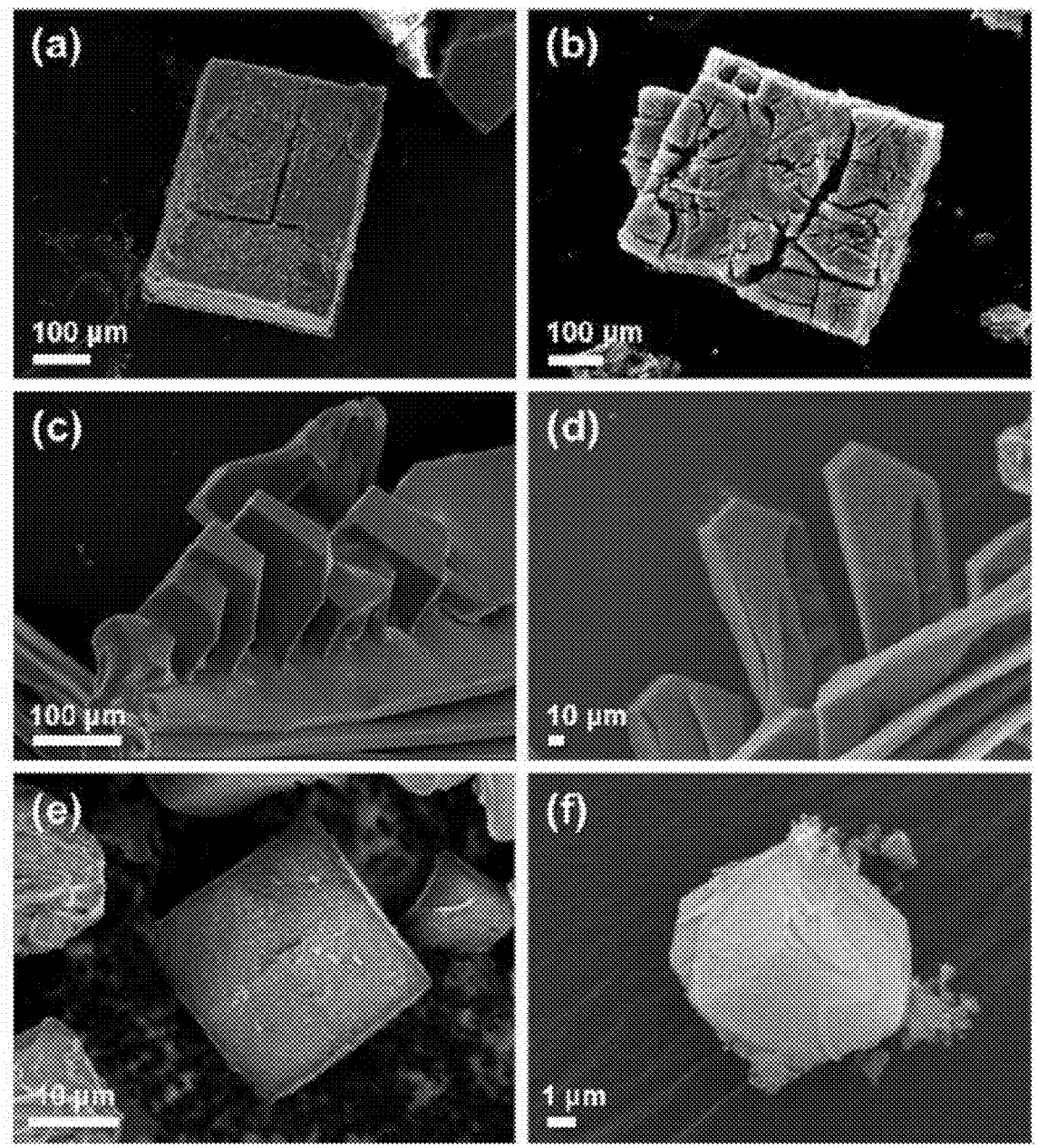

[Figure. 3]
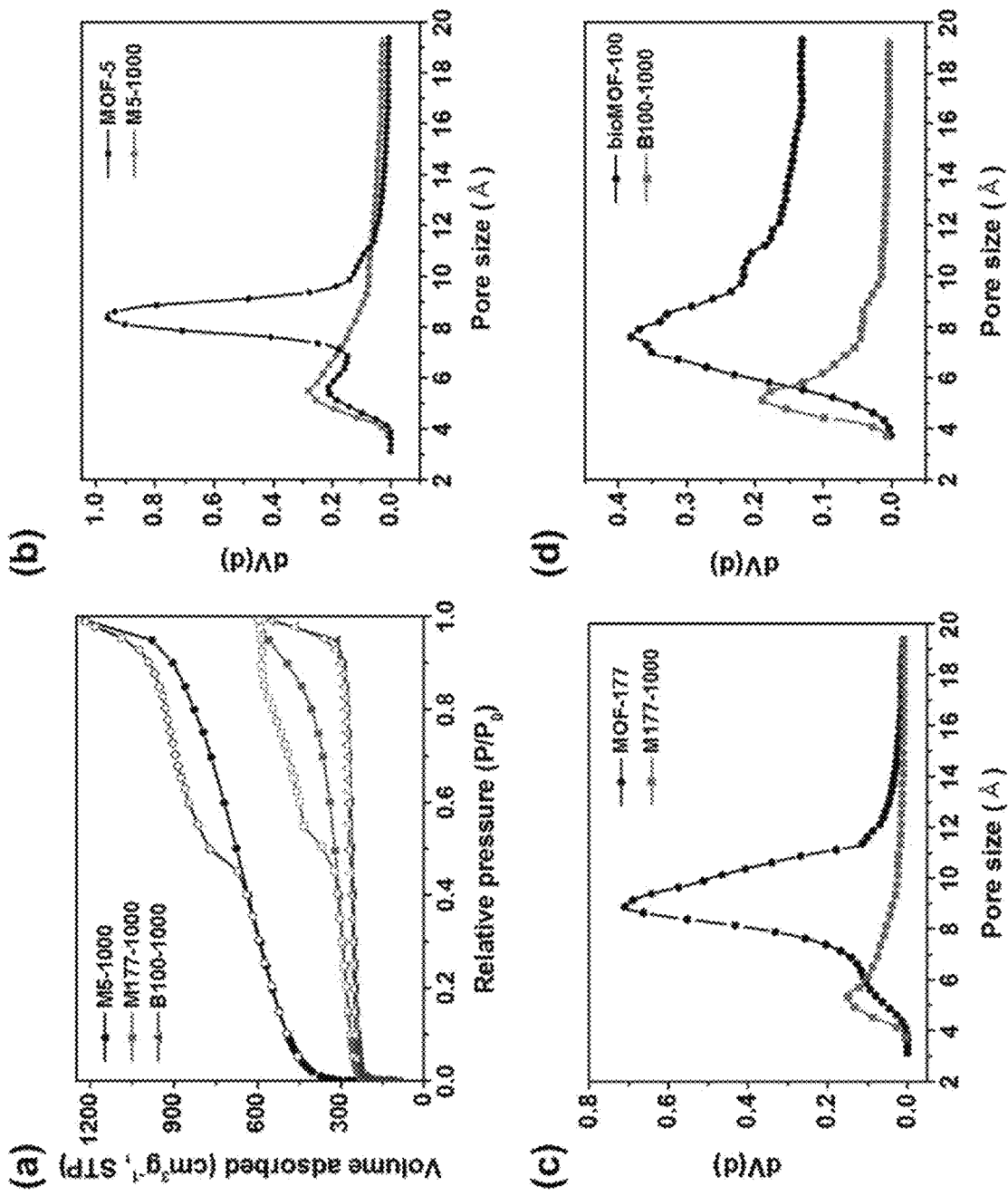

[Figure.4]
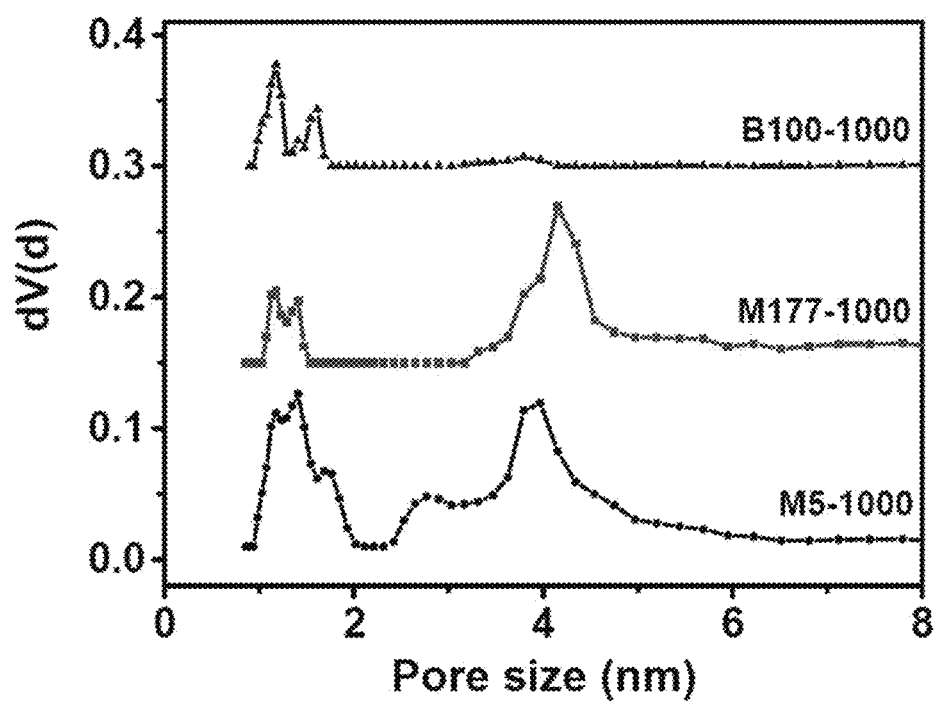

[Figure.5]
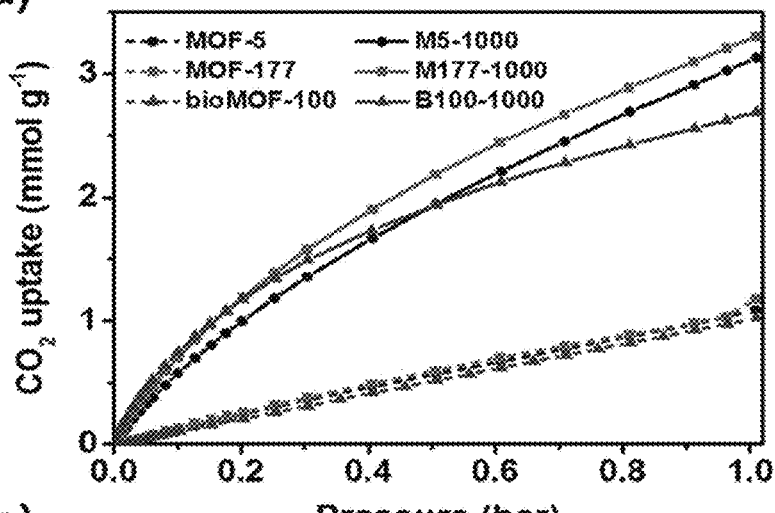
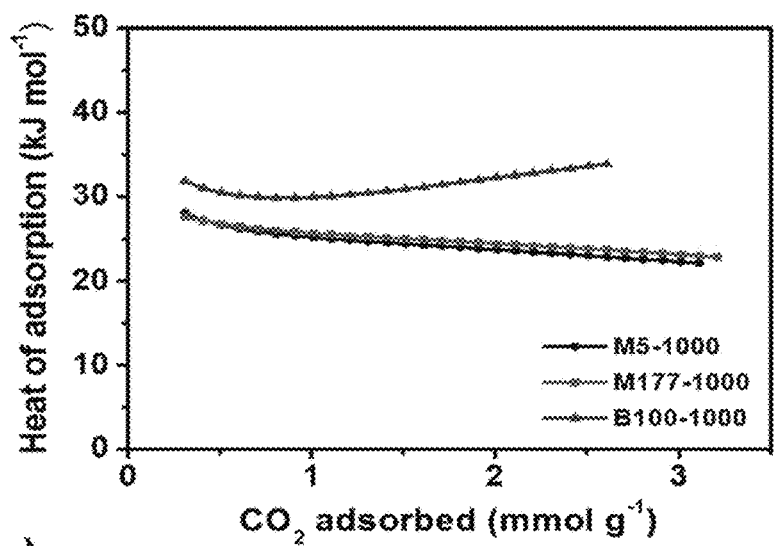
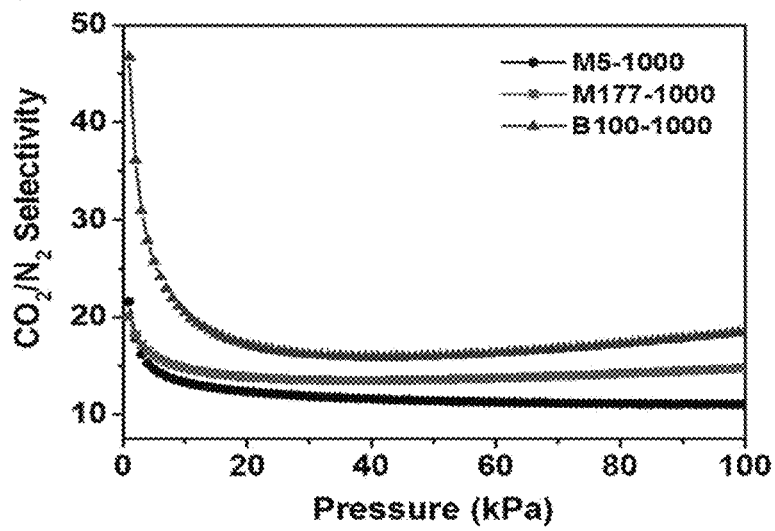

[Figure.6]
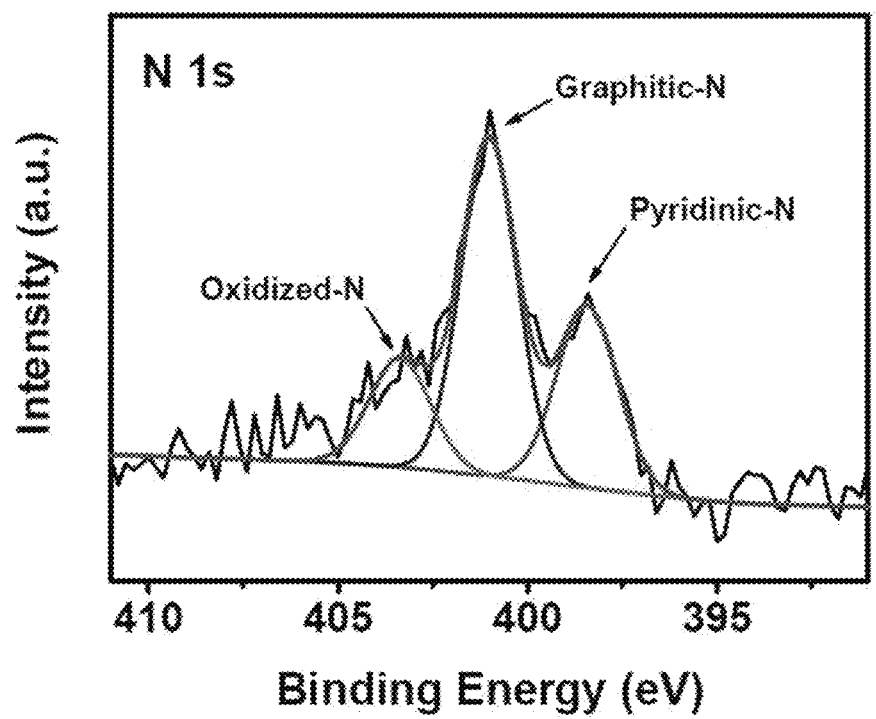
[Figure.7]
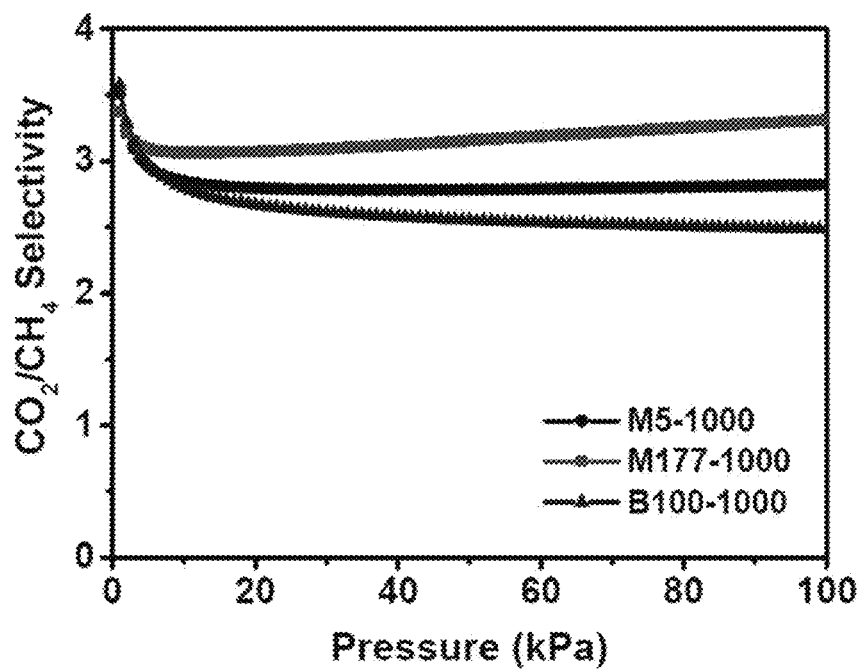

[Figure.8]
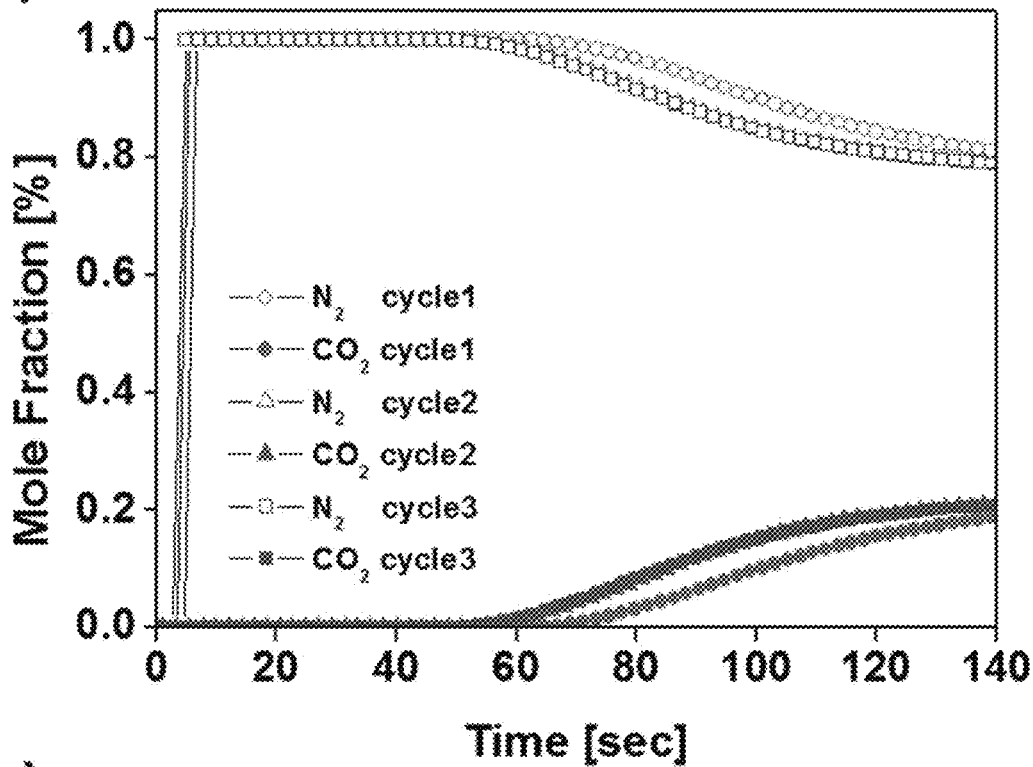
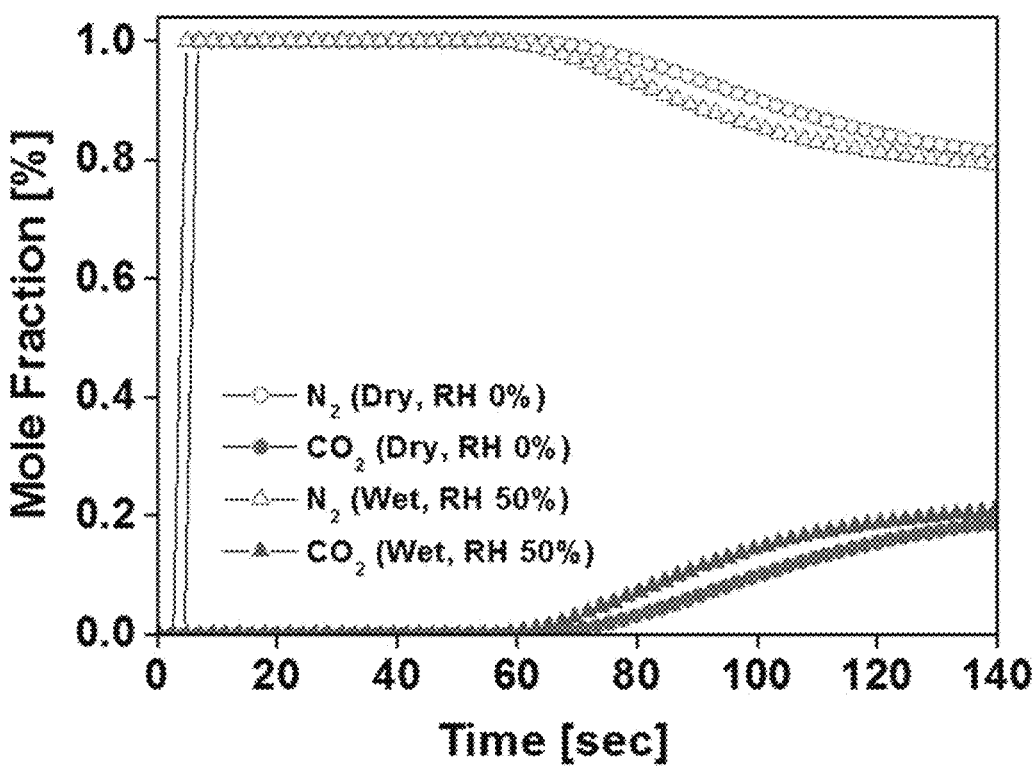

MOF-DERIVED POROUS CARBON MATERIALS FOR CARBON DIOXIDE CAPTURE

FIELD OF THE INVENTION

The present invention relates to MOF-derived porous carbon materials for carbon dioxide capture, more specifically comprising a method for preparing thereof and the porous carbon materials for the purpose of $CO_2$ absorbent, wherein the porous carbon materials from zinc-containing three MOFs (MOF-5, MOF-177, and bioMOF-100) are synthesized by a simple pyrolysis and thereby the porous carbon materials have promising $CO_2$ capture capacity and selectivity compared to parent of MOFs prior to pyrolysis, particularly, the $CO_2$ capture capacity of the porous carbon materials is maintained under humid condition.

BACKGROUND OF THE INVENTION

Continuous carbon dioxide ($CO_2$) emission from anthropogenic sources causes severe environmental issues such as global warming. The largest $CO_2$-emitting industrial sources are coal-fired power plants, in which post-combustion capture is often utilized to remove $CO_2$ from exhaust gas generated from combustion of fossil fuels. Flue gas from power plants is composed of carbon dioxide (~15-16%), water vapor (~5-7%) and nitrogen (~70-75%) at ~1 bar.

In order to separate and capture $CO_2$ from flue gas emissions at a power plant, monoethanol amine (MEA)-based aqueous solution is conventionally employed.

However, this wet-process requires a high-energy cost to regenerate absorbents because of not only an inherent high heat capacity of water in MEA solution but also chemisorption of $CO_2$ on MEA. Approximately 30% of energy produced from the power plants is usually wasted to regenerate the aqueous MEA

Solution

Moreover, volatility of MEA solution at high temperature and its corrosive character limit a wide use of MEA as an adsorbent for large-scale $CO_2$ capture.

Porous solid materials, which have lower heat capacity, have been emerging as a potential adsorbent for $CO_2$ capture application. Specifically, materials including zeolites, carbon materials, porous organic polymers (POPs) and amine-grafted silicas have been studied so far.

Among the various porous solids, metal-organic frameworks (MOFs), which are assembled by a coordination bond between a rigid organic ligand and diverse metal ions or metal clusters, have emerged as an outstanding adsorbent for $CO_2$ capture because of their enormous surface area and finely tunable surface functionality.

The study from Matzger and coworkers has demonstrated MOFs' excellent promising potential as $CO_2$ adsorbent, showing that [$Mg_2$ (DOBDC)] (DOBDC=2,5-dioxido-1,4-benzenedicarboxylate) exhibited a remarkable $CO_2$ uptake capacity (27.5 wt %) at 298 K and 1 bar.

However, most MOFs show instability toward moisture unfortunately, and it is one of the greatest challenges for establishing $CO_2$ capture from the flue gas containing water vapor.

Particularly, MOF-5 and MOF-177, composed of oxo-zinc secondary building unit and carboxylate linker, are known for their extreme instability upon exposure to moisture. In fact, MOF-5 showed a significant decrease of dynamic $CO_2$ adsorption capacity under humid condition (RH=65%) during three consecutive cycles.

Porous carbon materials and metal or metal oxide-carbon (M@C or MO@C) composites which are derived from MOFs have been used widely as platforms for green energy applications such as fuel cells, Li-ion batteries, supercapacitors and solar cells. In general, a simple pyrolysis of pristine MOF precursors affords these materials, and MOF-derived porous carbon materials are moisture stable due to the inherent hydrophobic property of porous carbon.

While numerous examples exist for electrochemical applications with these materials, to the best our knowledge, there are relatively few examples reported for capturing $CO_2$ with MOF-derived porous carbon materials, and most of the studies are limited to ZIF-8 (ZIF: zeolitic imidazolate frameworks) which is constructed from imidazolates and zinc(II) ions.

Besides, $CO_2$ adsorption study of these materials under humid conditions has not been reported yet.

PRIOR ARTS

Other Publications (Publication 1) S. R. Caskey, A. G. Wong-Foy and A. J. Matzger, J. Am. Chem. Soc., 2008, 130, 10890-10871.

DETAILED DESCRIPTION OF THE INVENTION

Problems to be Solved

For the purpose of satisfying the needs described above, the present invention provides porous carbon materials from zinc-containing MOFs (MOF-5, MOF-177, and bioMOF-100), a method for preparing thereof by a simple pyrolysis, and the porous carbon materials for the purpose of $CO_2$ absorbent.

The inventor identified a structure, porous property, surface area, $CO_2$ capture capacity and selectivity of $CO_2$ capture in three types of porous carbon materials (M5-1000, M177-1000 and B100-1000) from metal-organic frameworks (MOFs), which are synthesized by a simple pyrolysis. Additionally, the present inventor demonstrated that $CO_2$ capture capacity is maintained under humid conditions through dynamic breakthrough experiments.

Solution

For solving the above problems, the present invention provides porous carbon materials from metal-organic framework (MOF), wherein the porous carbon materials are synthesized by pyrolysis of a zinc-containing metal-organic framework, and the zinc-containing metal-organic framework is one selected from a group consisting of MOF-5, MOF-177 and bioMOF-100;

the pyrolysis removes all of zinc, thereby forming metal-free porous carbon structure; and the porous carbon materials are used for carbon dioxide ($CO_2$) capture (Image 1).

The three types of MOF have high surface areas over 3000 $m^2$ $g^{-2}$ as well as thermally removable zinc elements, and thus can be a desirable precursor for forming porous carbon materials.

Additionally, bioMOF-100 contains nitrogens in adeninate ligands, and thus $CO_2$ capture capacity of nitrogen-doped porous carbon material was tested in the present invention.

FIG. 9 is a schematic illustration of the preparation of porous carbon materials and their selective adsorption of $CO_2$.

In the present invention, pore size in the zinc-containing metal-organic framework (MOF) can be shrunken by pyrolysis and thus a suitable confined-space for $CO_2$ uptake can be provided.

Moreover, the pyrolysis can make the porous carbon materials in the present invention have amorphous property.

More specifically, the porous carbon materials in the present invention can have smaller micropore sizes compared to those of parent MOFs, and the pore size can be 4 Å to 8 Å.

When a MOF precursor, MOF-5 as zinc-containing metal-organic framework (MOF) is used, BET specific surface area of porous carbon materials (M5-1000) having porous carbon structure formed by pyrolysis of the MOF-5 may be 1978 $m^2$ $g^{-1}$, and $CO_2$ capture capacity of the porous carbon materials may be 0.81 mmol $g^{-1}$ under 298K and 0.15 bar, and $CO_2$ capture capacity of the porous carbon materials may be 3.13 mmol $g^{-1}$ under 298K and 1 bar.

Further, when MOF-177 as zinc-containing metal-organic framework (MOF) is used, BET specific surface area of the porous carbon materials (M177-1000) having porous carbon structure formed by pyrolysis of the MOF-177 may be 1039 $m^2$ $g^{-1}$, and $CO_2$ capture capacity of the porous carbon materials may be 0.97 mmol $g^{-1}$ under 298K and 0.15 bar, and $CO_2$ capture capacity of the porous carbon materials may be 3.30 mmol $g^{-1}$ under 298K and 1 bar.

Moreover, when bioMOF-100 as zinc-containing metal-organic framework (MOF) is used, BET specific surface area of the porous carbon materials (B100-1000) having porous carbon structure formed by pyrolysis of the bioMOF-100 may be 958 $m^2$ $g^{-1}$, and $CO_2$ capture capacity of the porous carbon materials may be 0.98 mmol $g^{-1}$ under 298K and 0.15 bar, and $CO_2$ capture capacity of the porous carbon materials may be 2.69 mmol $g^{-1}$ under 298K and 1 bar.

Among porous carbon materials in the present invention, N-doped porous carbon, B100-1000, may exhibit a better adsorption capacity and selectivity for $CO_2$ than other materials in the low pressure region, which can be caused by the improved $CO_2$ capture capacity at the existence of Lewis basic nitrogen.

Particularly, bioMOF-100 may maintain $CO_2$ capture capacity under humid condition, and thus be used suitably for $CO_2$ capture from flue gas including water vapor.

To be more specific, B100-1000 may separate $CO_2$ from $CO_2/N_2$ gas mixture under 50% of relative humidity (RH).

In another aspect of the present invention, a method for producing porous carbon materials from zinc-containing metal-organic framework (MOF) is provided, comprising:
S1) preparing MOF-5, MOF-177, or bioMOF-100 as metal-organic frameworks; and
S2) removing zinc by pyrolysis of the zinc-containing metal-organic framework, thereby forming metal-free porous carbon structure;
wherein the produced porous carbon materials may be used for $CO_2$ capture.

The pyrolysis may be performed at 1000° C. for 6 hours.

Specifically, the pyrolysis may be performed at 1000° C. for 6 hours after the zinc-containing metal-organic framework is heated with rate of 5° C./min until the temperature reaches 1000° C. under argon (Ar) atmosphere.

Effect of the Invention

Porous carbon materials from metal-organic framework in the present invention have an increased amount of $CO_2$ capture, an improved $CO_2$ capture capacity and selectivity more than a parent metal-organic framework.

Especially, porous carbon materials from metal-organic framework in the present invention maintains an excellent $CO_2$ capture capacity under humid condition, and thus can be applied properly to flue gas including water vapor from a thermoelectric power plant.

Additionally, porous carbon materials from metal-organic framework in the present invention can be synthesized by a simple pyrolysis of a MOF precursor.

Further, porous carbon materials from metal-organic framework in the present invention can be regenerated under warm condition after used for $CO_2$ capture, and thus be reused consequently.

The present invention can be used for producing a porous carbon absorbent using zinc (and nitrogen)-containing MOF precursors other than MOF-5, MOF-177 and bioMOF-100.

BRIEF DESCRIPTION OF THE DRAWINGS

FIG. 1 shows a graph (a) which is a graphic representation of powder X-ray diffraction (PXRD) patterns of the porous carbon materials, and a graph (b) which is a graphic representation of Raman spectra of M5-1000, M177-1000, and B100-1000.

FIG. 2 depicts Scanning electron microscopy (SEM) images of (a) MOF-5, (b) M5-1000, (c) MOF-177, (d) M177-1000, (e) bioMOF-100 and (f) B100-1000.

FIG. 3 shows a graph (a) which is a graphic representation of $N_2$ adsorption-desorption isotherms of the porous carbon materials, and graphs 3(b)-(d) which are graphic representations of H-K pore-size distributions of M5-1000, M177-1000, B100-1000 and their pristine counterparts, respectively.

FIG. 4 is a graphic representation of DFT pore size distributions of the porous carbon materials.

FIG. 5 shows a graph (a) which is a graphic representation of $CO_2$ adsorption isotherms of the pyrolyzed samples and parent MOFs at 298 K, a graph (b) which is a graphic representation of Isosteric heats of adsorption ($Q_{st}$) of M5-1000, M177-1000, and B100-1000 for $CO_2$, and a graph (c) which is a graphic representation of $CO_2/N_2$ selectivity of M5-1000, M177-1000, and B100-1000 obtained from IAST at 298 K.

FIG. 6 is a graphic representation of N 1s X-ray photoelectron spectroscopy (XPS) of B100-1000.

FIG. 7 is a graphic representation of $CO_2/CH_4$ selectivity (298K) of the porous carbon.

FIG. 8 shows a graph (a) which is a graphic representation of experimental breakthrough curves at three consecutive cycles for a packed-bed filled with B100-1000 with a step-input of a dry $CO_2/N_2$ mixture ($CO_2$: $N_2$=15:85, total flow rate=40 ml $min^{-1}$) at 303 K and 1 bar, and a graph (b) which is a graphic representation of breakthrough curves of $CO_2/N_2$ mixture ($CO_2$: $N_2$=15:85, total flow rate=40 ml $min^{-1}$) over B100-1000 at 303 K under dry and humid conditions (RH=50%).

DETAILED DESCRIPTION OF THE INVENTION

Figure 9:
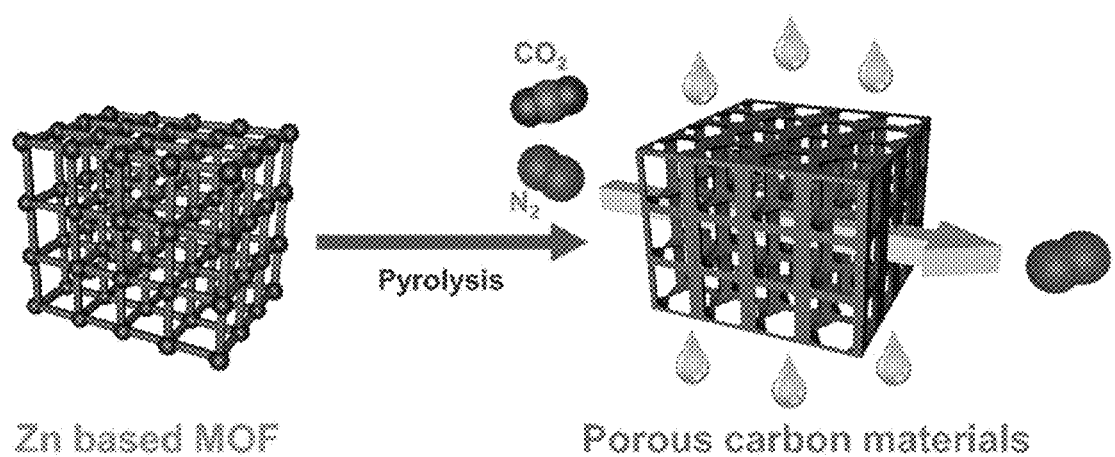
FIG. 9 is a schematic illustration of the preparation of porous carbon materials and their selective adsorption of $CO_2$.

Hereinafter, the present invention will be described in details based on examples. However, the examples are only for helping understand the present invention and the present invention is not limited thereto.

Example 1

Synthesis of Porous Carbon Materials

MOF-5, MOF-177 and bioMOF-100 were synthesized by a process reported in "H. K. Chae, D. Y. Siberio-Perez, J. Kim, Y. Go, M. Eddaoudi, A. J. Matzger, M. O'Keeffe and O. M. Yaghi, Nature, 2004, 427, 523-527" and "J. An, O. K. Farha, J. T. Hupp, E. Pohl, J. I. Yeh and N. L. Rosi, Nat. Commun., 2012, 3, 604."

A solution of adenine, biphenyldicarboxylic acid and zinc acetate dihydrate in N,N'-dimethylformamide (DMF) and methanol is heated in a capped glass vial for 24 h, and thus solvothermal reaction was proceeded. Consequently, colorless polyhedral block-like crystals of anionic bio-MOF-100 including ZABU building unit was yielded (*$Zn_8$ (ad)$_4$ (BPDC)$_6O_2$ · 4Me$_2$NH$_2$, 49DMF, 31H$_2$O).

In order to obtain porous carbon materials, zinc-based MOFs were pyrolyzed at 1000° C. for 6 h under Ar atmosphere. During the pyrolysis step, low boiling zinc metal (b.p. 907° C.) was completely removed and metal-free carbon materials was afforded consequently. Hereafter resultant porous carbons were denoted as M5-1000, M177-1000, and B100-1000, respectively.

EXPERIMENTAL EXAMPLES

(1) Phase Structure of Porous Carbon Materials

The phase structures of the porous carbon materials were studied via powder X-ray diffraction (PXRD) measurements (FIG. 1a). As shown in FIG. 1a, the samples displayed two weak and broad peaks around at 23 and 44°, which were assigned to the carbon (002) and (100) or (101) plane, respectively. These results indicate that the carbonized MOFs have an amorphous nature. Additionally, complete removal of zinc metal was verified by observing the absence of other peaks in PXRD.

(2) Local Structure of Porous Carbon Materials

Local structure information of the porous carbon materials was investigated by Raman spectroscopy (FIG. 1b). The pyrolyzed MOFs showed two distinct D and G bands centered at 1344 and 1587 cm$^{-1}$ respectively, resulting from the disordered carbon structures and the vibration mode for the movement of two carbon atoms in a single graphene sheet in the opposite direction. The intensity ratio of G band to D band ($I_G/I_D$) is related to a degree of graphitization in carbon materials. The $I_G/I_D$ values were 0.96, 0.87, and 1.03 for M5-1000, M177-1000, and B100-1000, respectively, indicating that the local carbon structures consist of both graphene and disordered carbon. Almost featureless second-order bands (2D and G+D) were observed between 2700 and 3000 cm$^{-1}$ for all of the samples, suggesting a disordered carbon network as evidenced by the PXRD patterns.

(3) Morphology of Porous Carbon Materials

Scanning electron microscopy (SEM) images of the porous carbon materials are shown in FIG. 2. Interestingly, each morphology of the parent MOFs was found to be retained, even after heating at high temperature. This indicates that the carbon content of the MOFs is suitable for the formation of carbon materials and the MOF is a stable support for the synthesis of the porous carbon materials.

(4) Pore Structure and Surface Area of Porous Carbon Materials

Detailed information about pore structures and surface areas of the pyrolyzed carbon materials was investigated by N$_2$ adsorption-desorption isotherms at 77 K. As shown in FIG. 3a, the isotherms of M5-1000 and M177-1000 revealed type IV shape with noticeable hysteresis, whereas that of B100-1000 exhibited type I shape with insignificant hysteresis. BET surface areas from the N$_2$ isotherms are shown in TABLE 1.

TABLE 1

Zn/C ratio of parent MOFs, BET surface areas, and CO$_2$ uptake properties of the porous carbon materials

| Sample | Zn/C ration of Parent MOFs | BET surface area (m$^2$g$^{-1}$) Parent MOFs | BET surface area (m$^2$g$^{-1}$) After Pyrolysis | CO$_2$ uptake at 298K (mmolg$^{-1}$) Parent MOFs (1 bar) | CO$_2$ uptake at 298K (mmolg$^{-1}$) After pyrolysis 0.15 bar | CO$_2$ uptake at 298K (mmolg$^{-1}$) After pyrolysis 1 bar | $Q_{st}$CO$_2$ (kJmol$^{-1}$) | Selectivity (IAST) |
|---|---|---|---|---|---|---|---|---|
| M5-1000 | 0.167 | 3031 | 1978 | 1.09 | 0.81 | 3.13 | 28.1-22.1 | 21.6-11.0 |
| M177-1000 | 0.074 | 3337 | 1039 | 1.18 | 0.97 | 3.30 | 27.6-22.9 | 20.0-13.5 |
| B100-1000 | 0.071 | 4300$^a$ | 958 | 1.02 | 0.98 | 2.69 | 33.9-31.8 | 46.7-15.9 |

$^a$This value is obtained from ref. 18.

Surface areas of the porous carbon materials were linearly increased with increasing Zn contents of parent MOFs precursors (TABLE 1).

Higher Zn contents in MOF precursors lead to a formation of larger amounts of Zn nanoparticles in the carbon matrix during the pyrolysis step.

Given that an evaporation of these Zn nanoparticles from the carbon matrix is responsible for the formation of the porous carbon structures, the above linear relationship between Zn contents and surface area might result from the different ratio of Zn/C in the parent MOF.

The DFT pore size distributions is shown in FIG. 4. B100-1000 was micropore-dominant while M5-1000 and M177-1000 have significant amounts of mesopores as well as micropores.

The detailed micropore size analysis was investigated using Horvath-Kawazoe (HK) model (FIG. 3b-d). Interestingly, the obtained carbon materials revealed smaller micropore sizes compared to those of parent MOFs. Pore size plays a key role in $CO_2$ capture performance, and narrow pores of ~4 Å to ~8 Å are particularly suitable for $CO_2$ adsorption due to the efficient overlap of attractive potential fields of opposite walls. Therefore, narrowing pore sizes by pyrolysis of Zn based MOFs might be a good strategy for $CO_2$ adsorption.

(5) $CO_2$ Capture Capacity of Porous Carbon Materials

In order to test the above strategy, the $CO_2$ adsorption isotherms of the porous carbon materials and their parent MOFs were measured up to 1 bar at 273 and 298 K (FIG. 5a).

As expected, all carbon materials revealed superior $CO_2$ capacities compared to those of their parent MOFs (FIG. 5a, and TABLE 1).

Micropore size distributions of the carbon materials were also shrunk to 4-8 Å after pyrolysis, thus enhanced performances for capturing $CO_2$ are presumably attributed to the generation of confined narrow space.

The $CO_2$ uptake for M177-1000 reached 3.30 mmol $g^{-1}$ at 1 bar and 298 K which was higher than those of both M5-1000 (3.13 mmol $g^{-1}$) and B100-1000 (2.69 mmol $g^{-1}$).

Adsorption amounts of all carbon materials were not saturated at 1 bar, suggesting a higher adsorption capacity for $CO_2$ at high pressure.

Flue gas from the power plants possess ~15% $CO_2$ at a total pressure of around 1 bar; consequently, the $CO_2$ uptake amount at 0.15 bar is an important index to evaluate adsorbents for realistic post-combustion capture of $CO_2$.

Uptake amount of M5-1000, M177-1000, and B100-1000 reached 0.81, 0.97, and 0.98 mmol $g^{-1}$, respectively, at 0.15 bar and 298 K. These values are comparable to those of representative inorganic carbon adsorbents.

Interestingly, the $CO_2$ uptake of B100-1000 at low pressures was slightly higher than those of M177-1000 and M5-1000, implying strong interactions between B100-1000 and adsorbed $CO_2$ molecules.

The isosteric heats of adsorption ($Q_{st}$) of M5-1000, M177-1000 and B100-1000 for $CO_2$ were calculated from the Clausius-Clapeyron equation to determine the adsorption affinity between the porous carbon materials and $CO_2$ molecules.

As depicted in FIG. 5b, B100-1000 showed higher $Q_{st}$ for $CO_2$ (33.9 kJ $mol^{-1}$) at near zero coverage than those of M5-1000 (28.1 kJ $mol^{-1}$) and M177-1000 (27.6 kJ $mol^{-1}$).

Higher $CO_2$ uptake and $Q_{st}$ of B100-1000 at low pressures might result from small amounts of Lewis basic nitrogen sites in the carbon matrix which had originated from adeninate ligands in bioMOF-100.

X-ray photoelectron spectroscopy (XPS) was carried out to verify the presence of Lewis basic nitrogen in the carbon surface (FIG. 6).

The atomic percentage of N in B100-1000 was 2.69%.

The high resolution N is spectrum of B100-1000 can be deconvoluted into three peaks corresponding to pyridinic N (398.5 eV), graphitic N (401.3 eV), and N-oxide (403.3 eV) respectively.

The presence of Lewis basic pyridinic N sites for $CO_2$ adsorption influence significantly on $CO_2$ capture. Therefore, the higher affinity of B100-1000 toward $CO_2$ in the low pressure region is attributed to the existence of Lewis basic nitrogen in the porous carbon surface.

(6) $CO_2$ Capture Selectivity of Porous Carbon Materials

Ideal adsorption solution theory (IAST) is normally conducted to predict the adsorptive behaviors of a two-component gas mixture from single-component isotherms.

The IAST adsorption selectivity for $CO_2/N_2$ at 298 K was calculated for 15/85 gas mixtures.

The experimental $CO_2$ and $N_2$ isotherms collected at 298 K for all carbon materials were fitted to the dual site Langmuir-Freundlich model. FIG. 5c and TABLE 1 show the IAST selectivity for $CO_2/N_2$ in the flue gas condition.

B100-1000 exhibited better performance for separating $CO_2$ from a gas mixture than other two carbon materials.

Selective adsorption of $CO_2$ from $CO_2/CH_4$ gas mixture is an important process in shale gas extraction.

Thus, the IAST adsorption selectivity for $CO_2/CH_4$ at 298 K was also calculated for 50/50 gas mixtures.

As depicted in FIG. 7, M177-1000 showed slightly higher selectivity toward $CO_2$ than other carbon materials.

However, selectivity of all porous carbons for $CO_2/CH_4$ are not greatly impressive, this might result from favorable interactions between the hydrophobic carbon surface and methane gas molecules.

(7) Dynamic Breakthrough Experiment

B100-1000 revealed superior $CO_2$ uptake and separation performance in the flue gas condition as described before.

Therefore, dynamic breakthrough experiments were performed to evaluate the potential of B100-1000 for the adsorptive separation of $CO_2/N_2$ mixtures.

FIG. 8 shows the breakthrough curves of $CO_2$ and $N_2$ upon separation of a $CO_2/N_2$ mixture ($CO_2$: $N_2$=15:85) on a column packed with B100-1000 pellets.

Nitrogen came out rapidly from the column, whereas carbon dioxide was strongly retained.

This clearly shows that B100-1000 can separate $CO_2$ and $N_2$ under dynamic flow conditions.

After performing a breakthrough experiment with a $CO_2/N_2$ mixture, the column was regenerated by purging it under a He flow of 40 ml $min^{-1}$ for 30 min without heating the column.

As shown in FIG. 8, essentially identical breakthrough curves were produced during the three consecutive cycles.

Such result was remarkable because the regeneration was performed under mild conditions.

In addition, since flue gases contained considerable amounts of water vapor, it was important to assess the performance of an adsorbent for $CO_2/N_2$ separation under humid conditions (RH=50%). As displayed in FIG. 8b, almost similar breakthrough curves were obtained even in humid conditions.

This indicates that B100-1000 adsorbent retains $CO_2/N_2$ separation ability well under humid conditions. As such, these results demonstrate the separation potential of B100-1000 for $CO_2/N_2$ mixtures under dynamic flow conditions in the presence of water vapor.

Review the Result

In the present invention, porous carbon materials (M5-1000, M177-1000, and B100-1000) were prepared by simple pyrolysis of pristine MOFs (MOF-5, MOF-177, and bioMOF-100).

The pyrolysis step led to the shrunken pore size of these materials and provided a suitable confined-space for $CO_2$ uptake. Consequently, all carbon materials revealed a remarkable enhancement of $CO_2$ uptake capacities compared to their parent MOFs.

Among the carbon materials, N-doped porous carbon, B100-1000, exhibited a better adsorption capacity and selectivity for $CO_2$ than other materials in the low pressure region, because the existence of the Lewis basic nitrogen was responsible for the improved $CO_2$ uptake.

Dynamic breakthrough experiments with B100-1000 showed that the B100-1000 can separate $CO_2$ and $N_2$ under dynamic flow conditions. Moreover, the separation ability of B100-1000 was retained even under humid condition.

MOF-derived porous carbons according to the present invention, which have narrow-sized micro-pores and Lewis basic sites, can be an excellent adsorbent for post combustion $CO_2$ capture process.

Further, it is possible that the present invention can be applied to a method for preparing porous carbon adsorbents using another zinc (and nitrogen)-containing MOFs other than MOF-5, MOF-177 and bioMOF-100 as precursors.

What is claimed is:

1. A composition for capturing carbon dioxide ($CO_2$), consisting of:
   a porous carbon material having a metal-free porous carbon structure and being derived from bio-metal-organic framework-100 (bioMOF-100),
   wherein the porous carbon material has micropores which is synthesized by pyrolysis of the bioMOF-100,
   wherein the pyrolysis being carried out at 1000° C. for 6 hours under argon (Ar) atmosphere removes all of zinc contained in the bioMOF-100,
   wherein the porous carbon material maintains $CO_2$ capture capacity under humid condition.

2. The composition of the claim 1, wherein the porous carbon material has the micropores smaller than pores of the bioMOF-100, a size of the mircopores ranging 4 Å~8 Å.

3. The composition of the claim 1, wherein the porous carbon material has amorphous property.

4. The composition of the claim 1, wherein BET (Brunauer, Emmett, Teller) specific surface area of the porous carbon material having porous carbon structure formed by the pyrolysis of the bioMOF-100 is 958 $m^2\ g^{-1}$, and $CO_2$ capture capacity of the porous carbon material is 0.98 mmol $g^{-1}$ under 298 K and 0.15 bar, and $CO_2$ capture capacity of the porous carbon material is 2.69 mmol $g^{-1}$ under 298 K and 1 bar.

5. The composition of the claim 1, wherein the porous carbon material is used for $CO_2$ capture from flue gas including water vapor.

6. The composition of the claim 5, wherein the porous carbon material separates $CO_2$ from $CO_2/N_2$ gas mixture under 50% of relative humidity (RH).

7. A method of preparing a composition for capturing carbon dioxide ($CO_2$), consisting of;
   S1) preparing bio-metal-organic framework-100 (bioMOF-100) by heating a solution containing adenine, biphenyldicarboxylic acid, and zinc acetate dihydrate; and
   S2) removing zinc from the bioMOF-100 by pyrolysis, thereby forming a metal-free porous carbon structure which has micropores synthesized by the pyrolysis,
   wherein the porous carbon material maintains $CO_2$ capture capacity under humid condition,
   wherein the pyrolysis is performed at 1000° C. for 6 hours under argon (Ar) atmosphere.

8. The method of claim 7, wherein the pyrolysis is performed at 1000° C. for 6 hours after the bioMOF-100 is heated with rate of 5° C./min until the temperature reaches 1000° C. under argon (Ar) atmosphere.

* * * * *